May 19, 1953     F. J. MULHOLLAND     2,638,953
ANTISKID DEVICE

Filed July 24, 1948     2 Sheets-Sheet 1

INVENTOR.
FRANK J. MULHOLLAND
BY
Morgan, Finnegan & Durham
ATTORNEYS.

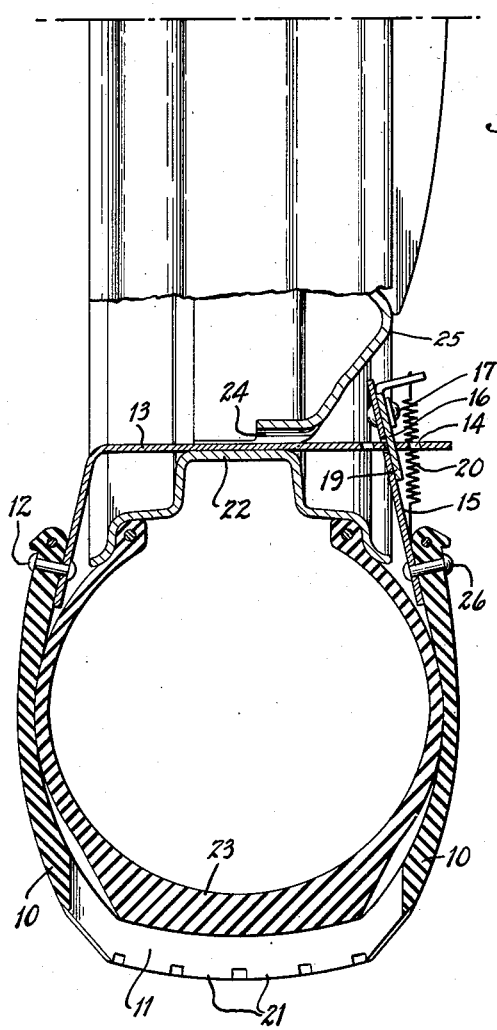
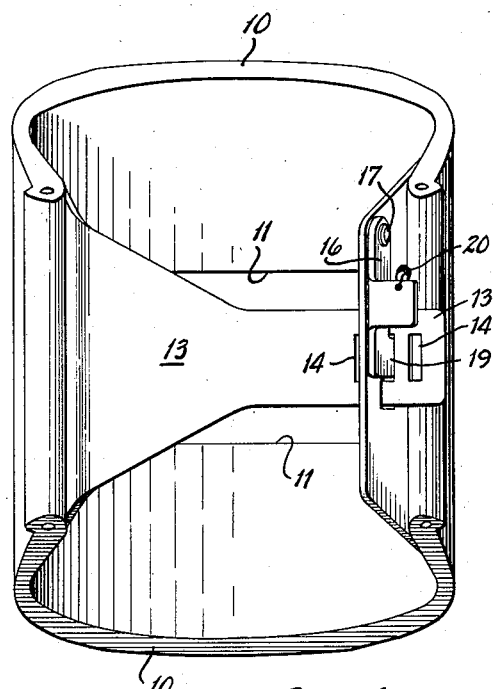
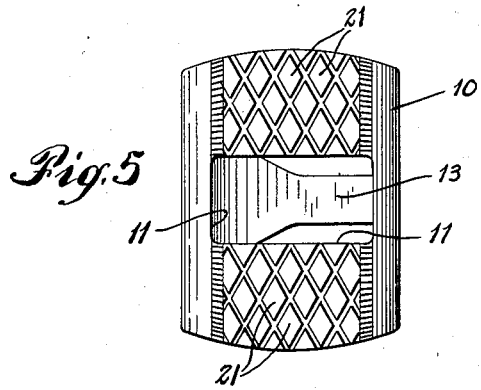

Patented May 19, 1953

2,638,953

UNITED STATES PATENT OFFICE 2,638,953

ANTISKID DEVICE

Frank J. Mulholland, Newburgh, N. Y.

Application July 24, 1948, Serial No. 40,580

1 Claim. (Cl. 152—221)

This invention relates to a device which will prevent an automobile from skidding. More particularly this invention relates to a device which is extremely effective in preventing an automobile from skidding and which at the same time can be easily and quickly fastened to a wheel of the automobile.

Objects and advantages of the invention will be set forth in part hereinafter and in part will be obvious herefrom, or, may be learned by practice with the invention, the same being realized and attained by means of the instrumentalities and combinations pointed out in the appended claim.

The invention consists in the novel parts, constructions, arrangements, combinations and improvements herein shown and described.

The accompanying drawings referred to herein and constituting a part hereof illustrate one embodiment of the invention and together with the description serve to explain the principles of the invention.

Of the drawings:

Fig. 3 is a sectional view taken through the line 3—3 of Fig. 1 and shows in further detail the manner in which the subject anti-skid device is attached to an automobile wheel;

Fig. 4 is a top view of the anti-skid device in its attached position; and

Fig. 5 illustrates the appearance of the flexible casing which fits tightly around an automobile tire and comprises one of the important elements of the subject invention.

An object of this invention is to provide an anti-skid device which can be fastened to an automobile wheel without having the driver or any service man crawl under the car or reach behind to the inboard side of the wheel in order to make a fastening.

A further object of this invention is to provide an anti-skid device having a casing which has approximately the same flexibility, riding characteristics and length of service life as that of the automobile tire to which it is attached.

A still further object of this invention is to provide an anti-skid device which will prevent lateral as well as forward skidding of an automobile.

With the stated and other objects in view there is provided in an illustrative embodiment of the invention a device which will effectively prevent an automobile from skidding in either a longitudinal or lateral direction. The device has a casing made from the same material as the automobile tire itself. This permits the casing to fit snugly over the tire, allows a rider to enjoy a smooth ride free of bumps and clanging noises, and increases the service life of the device. Since the casing extends for an appreciable length around the circumference of the tire, it will have a sufficient rigidity to guide the movement of a male latching member from the inboard to the outboard side of the tire and to guide the insertion of the male latching member into the female latching member on the outboard side of the tire.

A rigid steel bracket is attached to the inboard side of the casing and extends towards the center of the automobile tire to a point just above where the spokes or disc of the wheel are connected to the rim of the wheel. The bracket is bent so that it has an L-shape. Since the casing is made from a flexible material and since the bracket is bent at a point adjacent the rim so as to have an L-shape, the bracket may be pulled away from the inboard side when necessary. This step may be performed in order to facilitate insertion of the horizontal leg of the L through adjacent spokes or disc apertures of the wheel to the outboard side of the rim. Upon insertion of the horizontal leg of the L-shaped bracket through the rim, the outer portion of the horizontal leg passes through a slot in a steel plate which is fastened to the outboard side of the casing. A latching member is mounted upon the plate by a rivet so that it is pivotable about the rivet. The latch has a finger which passes through a slot in the horizontal leg of the L-shaped bracket, the slot being positioned on the outboard side of the wheel. The finger is of sufficient length to extend beyond the slot in the plate through which the bracket passes and thus holds the bracket in attachment to the plate. A spring attached to the latching member at one end and to the side of the casing at the other also aids in preventing the latch from slipping out of the slot in the bracket.

Figure 1:
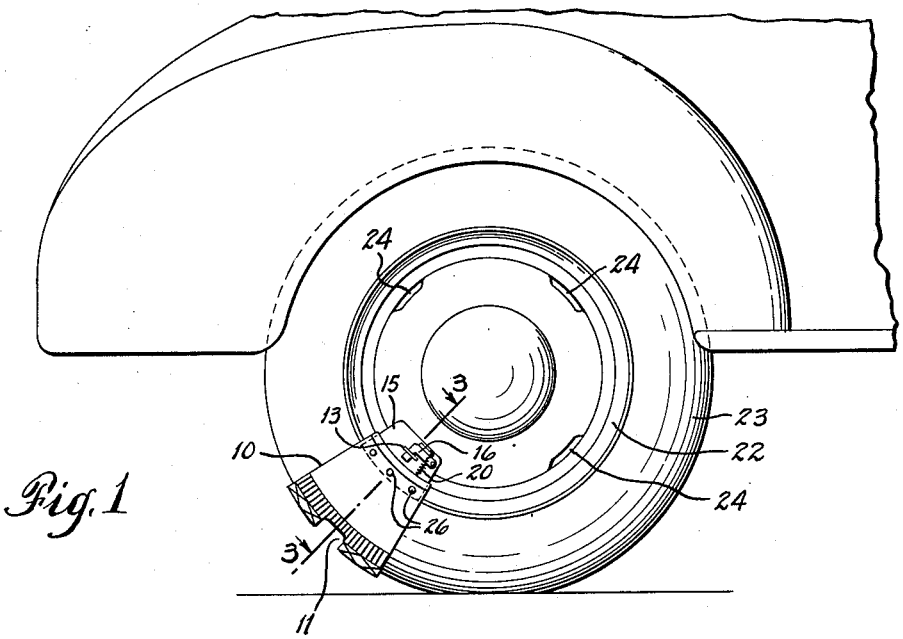
Fig. 1 is a front view showing the relationship of the anti-skid device to the wheel on which it is mounted.
Figure 2:
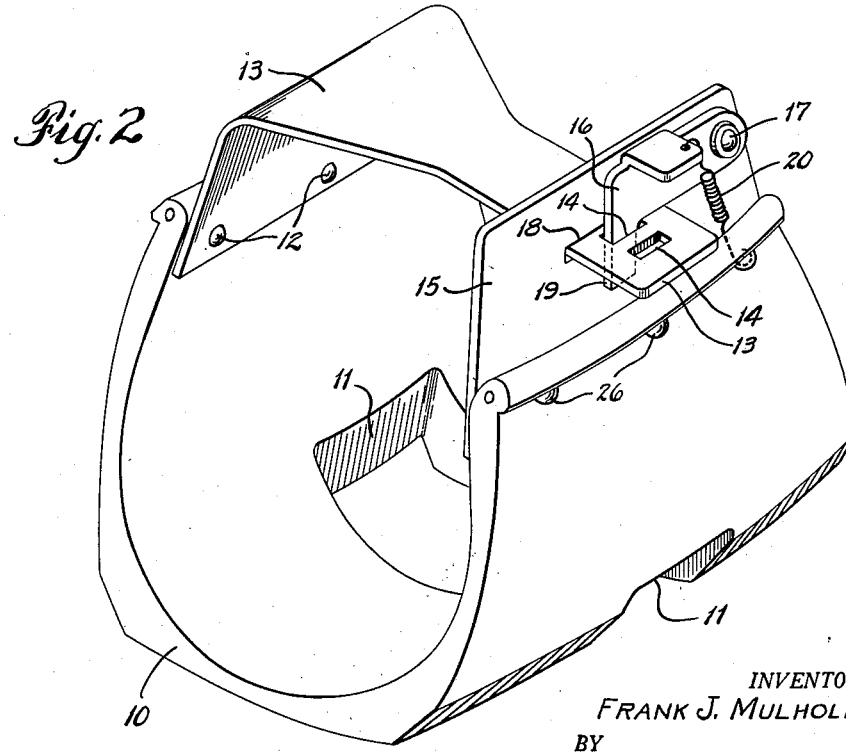
Fig. 2 is a perspective view illustrating the appearance of the subject anti-skid device when it is attached to a car wheel but with the wheel not being shown.

Referring now in detail to the embodiment of the invention shown by way of illustration in the accompanying drawings and referring first to Fig. 1, there is shown a device which will prevent skidding in either a longitudinal or a lateral direction. For this purpose, a casing 10 is employed which fits snugly around the outer perimeter of an automobile tire 23. The casing is made from a flexible material, such as rubber or any other chemical composition having the desired properties. Preferably, the casing should be made from the same material as the tire itself so that the automobile, when traveling, will have as smooth a ride and as long a life as possible. The casing extends for a sufficient length along the circumferential perimeter of the tire 23 to permit the casing to grip the tire as well as the roadway when the tire is rotating. It is this considerable length of the casing along the circumferential perimeter of the tire, together with the considerable degree of rigidity of the casing because of its composition and dimensions, that makes possible the guidance of the end of the L-shaped bracket, hereinafter to be described, through adjacent spokes or disc apertures by manipulation of the casing.

A rectangular aperture 11 is provided in the tread portion of the casing and is located centrally between the inner and outer sides of the casing tire. This cut-out portion permits the casing to grip the pavement firmly and is an instrumental factor in preventing skidding. The casing has treads 21 of a conventional design to prevent the car from skidding forward or to either side, or backward in case the car is traveling backward.

The flexible casing is shaped to conform to the contour of the encased tire 23 and extends around the tire positions on the inboard and outboard sides of the tire. On the inboard side, the longitudinal edge of the casing is fastened by the rivets 12 to a rigid bracket 13 which may be made from a hard steel, or any other material which will have a negligible deflection under load. The bracket extends on the inboard side towards the central axis of the wheel and is bent at a point just above the rim 22 of the wheel so that it has an arm which is substantially perpendicular to the arm just mentioned. As may be seen, this bracket is of substantially L shape, with the horizontal leg of the L extending from the inboard side of the wheel through one of the spaces 24 provided between the wheel disc 25 and the wheel rim 22 and then emerging on the outboard side of the wheel. As may be seen, the horizontal leg of the bracket decreases in width as it approaches the outboard side of the wheel in order to permit control over the movement of the narrow end of the bracket 13 during the installation by forces applied to the casing 10 and to permit a maximum strength to be attained by the vertical leg and at the same time allow the horizontal leg to fit between adjacent spokes. The bracket 13 has a plurality of slots at its outboard side.

On its outboard side, the casing is fastened by the rivets 26 to a rigid plate 15 which also may be made from steel or any other material not bendable under load. The plate hugs the outboard side of the tire 23 as it extends toward the central axis of the tire. A slot 18 is cut through the plate at a point just above the inner surface of the wheel rim 22 and this slot serves to contain the outer end of bracket 13, which passes through the slot. The plate also has a latch 16, which is fastened to its outer surface by a rivet 17, such that the latch is rotatable about the rivet 17.

In order to attach the subject anti-skid device to a wheel, the bracket 13 is placed behind the wheel by flexing the casing 10 and is then guided along the inner surface of the tire 23 by movement of the casing 10 so that its horizontal leg will be able to pass through the rim 22 from the inboard to the outboard side of the rim. As may be seen, the flexibility of the casing 10 facilitates this insertion through the rim because of the fact that it can move away from the tire which it encases. After passing through the inner side of the rim, the bracket is then inserted through the slot 18 in the plate 15, which is located on the outboard side of the wheel. The latch 16 on the plate 15 is now lifted and is thereafter lowered so that the finger 19 passes through the bracket slot 14. The finger 19 is of sufficient length to contact that part of the plate which lies below the slots 14 and thus helps to prevent the bracket 13 from slipping out of engagement with the plate 15. A tension spring 20, fastened at one end to the latch 16 and at the other end to the side of the casing also serves to prevent the finger 19 from slipping out of the bracket slot 14.

The invention in its broader aspects is not limited to the specific mechanisms shown and described, but departures may be made therefrom within the scope of the accompanying claim without departing from the principles of the invention and without sacrificing its chief advantages.

What is claimed is:

An anti-skid device for use on an automobile wheel having a rim and a tire mounted thereon, comprising, in combination, an anti-skid casing formed as a curved strip of material having about the flexible characteristics of a pneumatic tire casing and adapted to fit closely about the transverse circumferential perimeter of the tire; a rigid bracket having a first portion rigidly secured to and overlapping said anti-skid casing at its inboard side and extending substantially in prolongation thereof toward the wheel axis, and another portion integrally connected to said first portion and angularly turned with respect thereto, extending substantially parallel to the axis of the wheel and adapted to be positioned radially inwardly of the rim and presenting an end thereof at the outboard side of the wheel; a rigid plate secured to and overlapping said anti-skid casing at its outboard side and extending substantially in prolongation thereof toward the wheel axis; an aperture in said plate adapted to receive the end of said bracket; a plurality of apertures in said bracket adjacent the end thereof; a latch carried by said plate and alternately engageable with one of said apertures in said bracket for detachably interconnecting said plate and said bracket; and spring means for urging said latch into engagement with one of said apertures in said bracket.

FRANK J. MULHOLLAND.

References Cited in the file of this patent

UNITED STATES PATENTS

| Number | Name | Date |
|---|---|---|
| 1,358,975 | Mudge | Nov. 16, 1920 |
| 1,505,859 | Bulgarides | Aug. 19, 1924 |
| 1,570,851 | Metcalfe | Jan. 26, 1926 |
| 1,767,451 | Hedge | June 24, 1930 |
| 1,854,616 | Lowe | Apr. 19, 1932 |
| 2,198,883 | Pattison | Apr. 30, 2940 |
| 2,453,426 | Freed | Nov. 9, 1948 |
| 2,467,017 | Eger | Apr. 12, 1949 |